ns Patent [19]

Kirsch et al.

[11] 3,836,379
[45] Sept. 17, 1974

[54] QUINACRIDONE PIGMENT MIXTURES AND PROCESS FOR PREPARING THEM

[75] Inventors: Aloys Kirsch; Otto Fuchs, both of Frankfurt/Main; Ernst Spietschka, Oberauroff, all of Germany

[73] Assignee: Farbwerke Hoechst Aktiengesellschaft vormals Meister Lucius & Brüning, Frankfurt/Main, Germany

[22] Filed: Sept. 28, 1972

[21] Appl. No.: 293,135

[30] Foreign Application Priority Data
Sept. 30, 1971 Germany.......................... 2148866

[52] U.S. Cl.......................... 106/288 Q, 260/279 R
[51] Int. Cl............................................. C08h 17/14
[58] Field of Search.............. 106/288 Q; 260/279 R

[56] References Cited
UNITED STATES PATENTS
3,275,637  9/1966  West.............................. 106/288 Q
3,287,147  11/1966  Wilkinson....................... 106/288 Q Primary Examiner—Delbert E. Gantz
Assistant Examiner—J. V. Howard
Attorney, Agent, or Firm—Curtis, Morris & Safford

[57] ABSTRACT

Quinacridone mixtures consisting of 85 to 99.5 percent by weight of one or several linear trans-quinacridones of the general formula

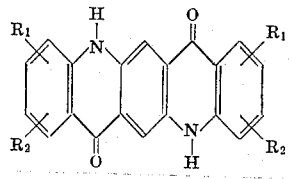

wherein $R_1$ and $R_2$ are identical or different and represent a hydrogen or halogen atom, an alkyl or alkoxy group having each 1 to 4 carbon atoms, an aryloxy, aryl, carbonamide or N-alkyl carbonamide group or which represent together the radical of an aromatic or heterocyclic ring, and 0.5 to 15 percent by weight of one or several linear trans-quinacridones of the general formula

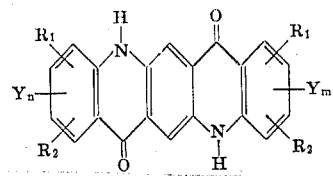

wherein Y represents a straight-chained or branched alkyl or alkoxy radical having 6 to 18 carbon atoms, $m$ and $n$ are integers of from 0 to 1 and the sum of $n$ and $m$ being 1 or 2 and $R_1$ and $R_2$ having the meanings given above. These mixtures are obtained by mixing with one another starting compound or final products substituted accordingly during the process of preparation or formation and processing in the manner usual for quinacridones. As compared to the single components the mixture thereof is more transparent and has a better color intensity, a better dispersability and fluidity of the lacquers colored with them and frequently more brilliant shades.

9 Claims, No Drawings

QUINACRIDONE PIGMENT MIXTURES AND PROCESS FOR PREPARING THEM

The present invention relates to mixtures of quinacridone pigments and to a process for preparing them.

It is known that quinacridones — depending on their preparation — are obtained either in too coarse crystals or in very fine imperfectly crystallized particles, which clog together while drying to form coarse agglomerates hard as grain. Thus, for example according to U.S. Pat. Nos. 2,821,529 and 2,891,580, the quinacridones are obtained in a coarsely crystalline form by ring closure of the 2,5-diarylaminodihydroterephthalic acid ester in solvents having a high boiling point and subsequent oxydation of the dihydroquinacridones. During the ring closure of the 2,5-diarylaminoterephthalic acids for example in polyphosphoric acid or in anhydrous hydrogen fluoride or when recrystallizing from sulfuric acid, however, the crude quinacridones are obtained in an imperfectly crystallized, partly amorphous, very finely divided form, in which they form, while drying, coarse agglomerates as hard as grain. In both forms, as crude crystals and as agglomerates hard as grain the quinacridones cannot be used as pigments. They can be converted into a fine division suitable for pigments only by wearisome and expensive grinding processes, if desired in the presence of solvents, as described for example in U.S. Pat. Nos. 2,844,484, 2,844,485 and 2,844,589 for the unsubstituted linear quinacridone.

According to German Pat. Nos. 1,184,881, 1,196,619 and 1,261,106 the aqueous moist press cake of the crude quinacridones, in which these ones have a very finely divided, partly amorphous form, may be subjected to a treatment with solvents which increases the crystalline character of the elementary particles and reduces, thus, the tendency to form agglomerates hard as grain. However, this process has the risk that — especially when using solvents having a relatively good solubility for quinacridones such as phenol, N-methylpyrrolidone, dimethyl formamide, tetramethylene sulfone, phosphoric acid-tris-dimethyl amide — the elementary particles are converted into too coarse crystals having only a reduced color intensity and transparence, or that — when using solvents of a small solubility such as alcohols, carboxylic acid esters, alkyl or halogen benzene — the finished pigments may contain a considerable finely grained portion which deteriorates their rheological properties such as dispersability and viscoelasticity and the fastness properties, as the fastness to light and to solvents.

From German Offenlegungsschriften Nos. 1,619,618 and 1,619,620 there are known quinacridone pigments, the rheological properties of which can be improved by addition of quinacridone sulfonic acids or their metal salts or of o-carboxybenzamidomethyl — substituted quinacridones. Both products have the disadvantage that they are well soluble in an alkaline solution and that they can be dissolved when the pigment is optionally after-treated with alkalis. German Pat. No. 1,217,333 and the Offenlegungsschriften Nos. 1,569,787 and 1,569,784 also describe mixtures of quinacridone pigments. These mixtures, however, have a homogeneous crystal structure which differs considerably from the crystal structures of the single components. The homogeneous crystal structure of these pigment mixtures, however, may cause the same adverse properties as in the case of the pure single components.

The object of the invention is quinacridone pigment mixtures consisting of 85 – 99.5 per cent by weight of one or several linear trans-quinacridones of the general formula

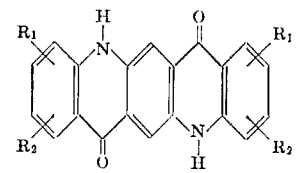

wherein $R_1$ and $R_2$ are identical or different and represent a hydrogen or halogen atom, an alkyl or alkoxy group having respectively 1 to 4 carbon atoms, an aryloxy, aryl, carbonamide or N-alkyl-carbonamide group or represent together the radical of an aromatic or heterocyclic ring, and consisting of 0.5 to 15 per cent by weight of one or several linear trans-quinacridones of the general formula

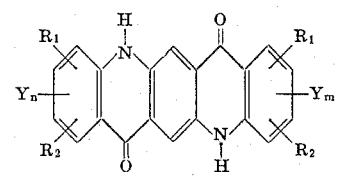

wherein Y represents a straight-chained or branched alkyl or alkoxy radical having 6 to 18 carbon atoms, $m$ and $n$ are integers of from 0 to 1 and the sum of $n$ and $m$ is one or two and $R_1$ and $R_2$ have the meanings given above.

The invention further relates to a process for preparing the above-mentioned quinacridone mixtures, in which the starting compounds substituted accordingly or the final products are mixed with one another during the process of preparation or formation and processed in the manner usual for quinacridones.

As substituents among the above meanings $R_1$ and $R_2$ there are considered for example halogen atoms such as chlorine or bromine atoms, aryloxy and aryl groups, as for example phenoxy and phenyl, a carbonamide group, which may be substituted by lower alkyl groups as well as aromatic or heterocyclic ring systems such as for example quinacridones, which are obtained by using α-or β-naphthyl amine, 3-aminocarbazole or 3-amino-N-ethyl carbazole.

The amount of the additional component used is irrelevant. It may be varied within certain limits, but the following conditions must be respected.

The amount of the additional component must not be as large as to deteriorate the fastness properties such as the fastness to bleeding, to overspraying and to solvents of the pigment as compared to the pure main component. The additional component is not allowed to influence the crystal structure of the main component, i.e., after finish the mixture must have the same crystal structure as the pure main component would have under the same finishing conditions. In the case of the unsubstituted linear quinacridone the additional component is not allowed to affect adversely the conversion of the crude quinacridone into the pure β- or γ-crystal phase. Furthermore the portion of the additional component must be as large as to obtain the desired improvements of the tinctorial properties of the pigment. The portion of the additional component generally ranges between 0.5 and 15 per cent by weight, calculated on the total amount of the ready pigment. It also depends on the degree of substitution of the additional component, for example on whether only one or two alkyl or alkoxy radicals with 6 to 18 carbon atoms are contained in the molecule; the higher the degree of substitution, the smaller is the necessary amount. 2 to 5 per cent by weight of the additional component are preferably used.

The preparation of the quinacridone pigment mixtures according to the invention may be effected on different levels of the whole preparation and formation process of the quinacridones.

Thus, it is possible to synthetize separately the main and additional component by ring closure of the 2,5-diarylaminoterephthalic acids substituted accordingly. These acids are prepared by condensing succinylo-succinic acid esters with 2 mols of arylamine in the presence of glacial acetic acid or catalytic amounts of hydrochloric acid, oxydating the primarily formed diarylamino-dihydroterephthalic acid ester with, for example, nitro compounds or air, if desired in the presence of quinones, to form the 2,5-diarylaminoterephthalic acid esters, and saponifying them with alkalis.

A preferred process for preparing the alkyl- or alkoxy-substitvted diarylaminoterephthalic acids as starting compounds for the additional component consists in carrying out condensation, oxydation and saponification in a single-pot process — since the 2,5-diarylaminoterepthalic acid esters formed as intermediate — due to the long-chained alkyl radical — are very easily soluble in organic solvents and difficult to be isolated. In this process all the volatile constituents are distilled off in vacuo after oxydation with nitrobenzene, the 2,5-diarylaminoterephthalic acid esters are given into methanol or ethanol and saponified with concentrated alkali.

It is also possible to use in all the processes described above two or several quinacridones of the general formula (1) or their corresponding starting compounds, so that instead of one single main component a mixture of several main components is obtained.

The crude quinacridones thus obtained may be mechanically mixed in the desired mixture ratio as dry products or as aqueous moist press cakes and this mixture may be finished subsequently according to known processes. It is also possible to dissolve the dry crude quinacridones in the desired mixture ratio in sulfuric acid, polyphosphoric acid, ethyl sulfuric acid or other acids, to fill up the quinacridone mixture with water or organic solvents and to finish the mixture optionally according to known processes.

A further possibility for preparing the quinacridone pigment mixtures according to the invention consists in introducing into the reaction on different levels of the preparation process of the crude quinacridones the differently substituted starting compounds in the mixture ratio desired.

Thus, one mole of succinylo-succinic acid ester may be condensed with one mol each of aniline or toluidine and one mol of a long-chained substituted aniline, such as p-dodecylaniline. The diarylamino terephthalic acids thus obtained are cyclicized in the manner usual in the case of quinacridones and this quinadridone is then blended with the necessary amount of the main component.

It is obvious that the diarylamino-terephthalic acid, which contains the long-chained radical may be mixed with the diarylaminoterephathalic acid serving as starting compound for the main component and that this mixture may be cyclicized. This process is suitable if the additional component shall contain only a long-chained radical.

For preparing the pigment mixtures according to the invention, mixtures of 2,5-diarylaminoterephthalic acids are suitable; they are obtained if less than one mol of the arylamine carrying long-chained substituents and accordingly more of the arylamine carrying short-chained substituents are condensed with one mol of succinylo-succinic acid ester. By this way, a 2,5-diarylaminoterephalic acid mixture may be prepared, which provides, while being cyclicized, the crude quinacridone mixture in the composition desired.

All the processes known and described for the pure quinacridones may be employed for the finish of the crude quinacridone mixtures; for example grinding the dried mixture in suitable grinding aggregates such as in roll, vibrating or perl mills, if desired, in the presence of mineral salts and/or organic solvents or by heating the aqueous moist press cakes, in which the crude quinacridone mixtures already have a very fine division, with organic solvents, if desired under pressure or distilling off water (German Pat. No. 1,261,106). In the grinding processes the grinding period is reduced, since the agglomerates of the mixtures are not as hard as those of the pure crude quinacridones; on the contrary, the solvent finish may be intensified (higher temperatures, longer heating times), whereby the agglomerating very finely grained portion disappears and the crystalline character is increased, without being formed crystals which are too large and too coarse and thus, have a too marked covering effect and are wee-colored.

In contradistinction to the pure main components and the quinacridone pigment mixtures according to the state of the art mentioned above, the quinacridone pigment mixtures according to the invention are characterized by a higher transparency and color intensity, a better dispersability and fluidity of the lacquers colored with them and frequently by more brilliant shades. Furthermore, in contradistinction to the pigment mixtures known from German Offenlegungsschriften Nos. 1,619,618 and 1,619,620, they are not soluble in alkalis. As compared with the pigment mixtures from German Pat. No. 1,217,333 and German Offenlegungsschriften Nos. 1,569,784 and 1,569,787, the mixtures according to the invention have the advantage that the additional component does not cause any alteration of the shade of the main component.

The mixtures according to the invention are generally used as pigments and especially for coloring lacquers.

The following Examples illustrate the invention. Parts and percentage are by weight unless stated otherwise. The relationship between parts by weight and parts by volume is as grams to cubic centimeter.

EXAMPLE 1 a. 36.3 Parts of aniline, 102 parts of dodecyl aniline and 100 parts of succinylo-succinic acid ethyl ester were heated under a nitrogen atmosphere in 250 parts of ethanol. 1 Part of concentrated hydrochloric acid was added at the boiling temperature, and the solution was refluxed for two hours. By simultaneous addition of 200 parts of nitrobenzene the alcohol was distilled off and the reaction solution was heated to 125°C. At 110°C 30 parts of glacial acetic acid and 1 part of piperidine were added. The mixture was stirred for another 3 hours at 125°–130°C. Then the nitrobenzene was distilled off in vacuo, and the residue was saponified under reflux with 200 parts of ethanol and 100 parts of a 33 percent sodium hydroxide solution for 1½ hours. The alcohol was distilled off while adding dropwise simultaneously 250 parts of water, and the aqueous solution of the alkali salt was mixed with 20 parts of kieselguhr. The solution clarified over a filter was added while stirring onto a mixture of 400 parts of a 20 percent hydrochloric acid and 200 parts of ice, the acid precipitated was filtered off, washed free from chloride ions and dried in vacuo at 80°C. The 2-anilino-5(-p-dodecyl)anilinoterephthalic acid was obtained as a red violet powder in a yield of 196 parts, which corresponds to a yield of 97%, calculated on the succinylo-succinic acid ethyl ester.

b. A mixture of 95 parts of di-(p-toluidino)-terephthalic acid and 5 parts of the 2-anilino-5-(p-dodecylanilino)-terephthalic acid prepared under (a) was stirred for one hour at 200°C in a melt of 700 parts of anhydrous aluminium chloride and 198.8 parts of sodium chloride. The melt was added to a mixture of 7,000 parts of ice and 2,000 parts of a 16% hydrochloric acid, the quinacridone precipitated was filtered off, washed until neutral and dried. 50 Parts of the crude quinacridone mixture thus obtained were completely dissolved in 250 parts of polyphosphoric acid at 120°–125°C and reprecipitated by pouring the solution into 750 parts of ice water, filtered off and washed until neutral. In order to remove any starting product present or only partly cyclicized by-product the reaction mixture was heated with 5 to 10 times the amount (calculated on the crude quinacridone mixture 100%) of a 3% potassium hydroxide solution in 15% ethanol, filtered and washed until neutral.

c. The crude quinacridone mixture obtained was finished according to the instructions given in German Pat. No. 1,261,206. The aqueous press cake (about 20% of pure dyestuff) was stirred with 225 parts of ethanol and 225 parts of water (including press cake water) for 5 hours in the autoclave at 150°C. The reaction mixture was filtered, washed free from alcohol with water and dried in vacuo at 80°C. About 43 parts of a bluish red pigment were obtained, the X-ray diagram of which coincided with that of the 2.9-dimethyl-quinacridone. It differed from that one by a higher tinctorial strength and transparency and a better dispersability and resistance to flocculation in lacquers.

If for example 1a) per 100 parts of succinylo-succinic acid ethyl ester and 36.3 parts of aniline, the 102 parts of dodecyl aniline (molar ratio 1:1:1) were replaced by 80.2 parts of p-octyl aniline, 85.7 parts of octyl toluidine, 90.2 parts of decyl aniline, 1.9 parts of tetradecyloxy aniline or 133.2 parts of octadecyl aniline or if the 36.3 parts of aniline were replaced by 41.8 parts of p-toluidine, there are obtained according to the same method in about the same good yields the anilino-alkyl- or alkoxyanilino- or toluidino-alkyl- or alkoxyanilino-terephthalic acids substituted accordingly, which may be used with similar good results as mixed components.

EXAMPLE 2 a. 100 Parts of the anilino-(p-dodecylanilino)-terephthalic acid prepared under a) were stirred for one hour at 125°C with 500 parts of polyphosphoric acid (about 83–84% of $P_2O_5$). The melt was added to a mixture of 1,000 parts of water and 500 parts of ice, the dodecyl quinacridone precipitated was filtered off and washed until neutral. An aqueous press cake was obtained, which contained about 30% of dodecyl quinacridone 100% in a very finely divided form.

b. 100 Parts of 2,5-dianilino-terephthalic acid were cyclicized with 500 parts of polyphosphoric acid as described under (a). The linear trans-quinacridone was precipitated in the form of a 20% neutral aqueous press cake, (calculated on quinacridone 100%), wherein it has the form of the α-crystal phase.

c. 7 Parts of the press cake obtained under (2a) (2.1 parts of dodecyl quinacridone 100%) and 210 parts (=42 parts of quinacridone 100%) of an aqueous moist press cake (obtained according to 2b) were stirred to a paste in a solution of 13.3 parts of potassium hydroxide and 66.2 parts of ethanol in 188.6 parts of water and refluxed for 30 minutes. The suspension was filtered at 50°C and washed until neutral. Thus, the crude quinacridone mixture was obtained free from starting products and alkali-soluble by-products in the form of an aqueous press cake.

d. This press cake was stirred with 400 parts of N-methyl pyrrolidone for three hours at 115°–120°C (German Pat. No. 1,196,619).

At 60°C the whole was filtered, the press cake was washed first with methanol, then with water and dried in vacuo at 80°C. A quinacridone mixture in the γ-crystal phase was obtained, which could be better dispersed in lacquers and provided more intense and more transparent lacquers than a pure unsubstituted quinacridone of the α-crystal phase obtained under the same conditions.

EXAMPLE 3:

95 Parts of 2,5-dianilino-terephthalic acid and 5 parts of an anilino-dodecylanilino-terephthalic acid prepared according to Example 1a were cyclicized in 500 parts of polyphosphoric acid (83–83.5% of $P_2O_5$) by heating for 1 hour to 125°C. The melt was hydrolized by pouring it into the triple amount of water of 50°C, the crude quinacridone was filtered and washed neutral. The crude quinacridone mixture was precipitated as an about 20% aqueous press cake; it consisted of a mixture of α- and β-crystal phase.

The moist crude quinacridone mixture was converted into the pure β-crystal phase according to German Pat. No. 1,150,046. 225 Parts of anaqueous moist press cake (about 45 parts of a quinacridone mixture 100%) and 450 parts of a 15% aqueous sodium hydroxide solution (including 180 parts of press cake water) were stirred for 7 hours at 150°C in a pressure vessel. The suspension was filtered at 60°C and washed until neutral. The press cake in which the quinacridone mixture has the pure β-phase was finished with 225 parts of ethanol, 225 parts of water (including press cake water) and 1.5 parts of potassium hydroxide. After having suction-filtered, washed until neutral and dried at 80°C in vacuo, the quinacridone mixture was obtained in the red violet β-crystal phase. As compared with the pure non-substituted quinacridone the pigment was distinguished by a considerably higher color intensity and transparency as well as by a better dispersability and resistance to flocculation.

EXAMPLE 4 a. 100 Parts of succinylo-succinic acid ethyl ester and 160 parts of p-heptyl aniline were condensed as in Example 1a, oxydated and saponified. The 2,5-bis-(p-hepthylanilino)-terephthalic acid was obtained in the form of a violet powder in a 95% yield (calculated on the succinylo-succinic acid ethyl ester used).

If instead of 160 g of p-heptyl aniline 170 g of p-heptoxyaniline were used the same yield of 2,5-bis-(p-heptoxyanilino)-terephthalic acid was obtained.

b. In a pressure vessel 95 parts of dianilino-terephthalic acid and 5 parts of 2,5-bis-(p-heptylanilino)-terephthalic acid were stirred for 5 hours at 150°C with 1,000 parts of anhydrous hydrogen fluoride. The largest part of the hydrogen fluoride was distilled off and the residue was added while stirring onto ice and sodium hydroxide solution. The quinacridone mixture precipitated was suction-filtered and washed until neutral, it was obtained as an about 25% press cake. 200 Parts of the press cake were heated to 150°C with 400 parts of diethylene glycol-monomethyl ether, while the water was distilled off, and stirred for three hours at this temperature. The reaction mixture was diluted with methanol, filtered and washed with methanol and water and dried in vacuo at 80°C. The quinacridone mixture in the γ-crystal phase obtained was characterized by a good dispersability, a high tinctorial strength and a good transparency.

A comparable result was obtained when the 2,5-bis-(p-heptoxyanilino)-terephthalic acid was used.

EXAMPLE 5

97 Parts of 2,5-bis-(m-chloroanilino)-terephthalic acid and 3 parts of the anilino-octadecylanilino-terephthalic acid prepared according to Example 1a were introduced at 70°–80°C into 500 parts of polyphosphoric acid having a content of $P_2O_5$ of about 85% and the mixture was stirred for 2 hours at 140°C. The melt was added to ice water, the quinacridone mixture was filtered and washed neutral. The crude quinacridone thus obtained was finished according to German Pat. No. 1,261,106 by heating with 400 parts of dimethyl formamide to 125°C, while distilling off water. After stirring for 2 hours at 125°C the suspension was filtered, washed with methanol and water and dried in vacuo at 80°C. The quinacridone mixture was obtained in the form of the 3,10-dichloro-quinacridone as a yellowish red, color-intense, transparency and well dispersable pigment.

EXAMPLE 6

92 Parts of 2,5-bis-(p-toluidino)-terephthalic acid and 8 parts of a p-toluidino-p-dodecylanilino-terephthalic acid obtained according to Example 1a were cyclicized by heating for one hour to 125°C in three parts of polyphosphoric acid having a content of $P_2O_5$ of 84 to 85%. After hydrolysis in water heated to 50°C the moist press cake washed until neutral was stirred for three hours at 150°C with 400 parts of benzoic acid methyl ester. The suspension was diluted with methanol, suction-filtered, washed with methanol and dried in vacuo at 60°C. A color-intense, well dispersable pigment mixture was obtained having the crystal structure of the pure 2,9-dimethyl quinacridone.

EXAMPLE 7

A mixture of 160 parts of 2,5-bis-(p-toluidino)-terephthalic acid, 30 parts of 2,5-dianilino-terephthalic acid and 10 parts of anilino-dodecylanilino-terephthalic acid was stirred in 1,000 parts of polyphosphoric acid (84% of $P_4O_5$) for 1 hour at 125°C, the melt was hydrolized with ice water, the quinacridone mixture was filtered and washed until neutral. After extraction with a 3% potassium hydroxide solution in a 15% ethanol, the neutral aqueous press cake (about 180 g of a quinacridone mixture 100%) was stirred with 900 parts of ethanol and 900 parts of water (including press cake water) for 3 hours at 150°C. A pigment mixture was obtained which — in contradistinction to the pure 2,9-dimethyl quinacridone — was more yellowish, more transparent, had a more intense color and a better resistance to flocculation.

We claim:

1. Quinacridone mixtures consisting of 85 to 99.5 per cent by weight of a main component of one or several linear trans-quinacridones of the formula

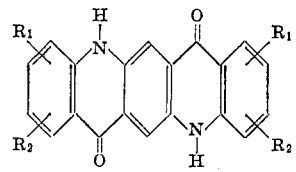

wherein $R_1$ and $R_2$ are hydrogen, chlorine, bromine, alkyl, alkoxy each with 1 to 4 carbon atoms, phenoxy, phenyl, carbonamido or lower alkyl carbonamido or which together may form a phenyl, indol or N-ethylindol ring and 0.5 to 15 percent by weight of and added component of one or several linear trans-quinacridones of the formula

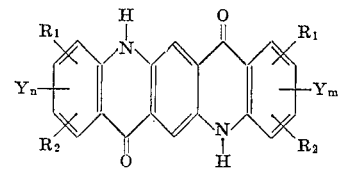

wherein Y is alkyl or alkoxy with 6 – 18 carbon atoms, m and n are integers of from 0 to 1 and the sum of $n$ and $m$ is 1 or 2 and $R_1$ and $R_2$ are defined as above.

2. The mixtures of claim 1 in which the main component comprises dimethyl-quinacridone and the added component comprises dodecyl-quinacridone.

3. The mixtures of claim 1 in which the main component comprises di-methyl-quinacridone and the added component comprises tetradecyloxy-quinacridone.

4. The mixtures of claim 1 in which the main component comprises a quinacridone and the added component comprises di-heptoxy-quinacridone.

5. The mixtures of claim 1 in which the main component comprises dichloro-quinacridone and the added component comprises octadecyl-quinacridone.

6. The mixtures of claim 1 in which the main component comprises dimethyl-quinacridone and the added component comprises methyl-dodecyl-quinacridone.

7. The mixtures of claim 1 characterized in that they are insoluble in alkalis.

8. The mixtures of claim 1 in which $R_1$ and $R_2$ are hydrogen, chlorine, bromine, alkyl or alkoxy each with 1 to 4 carbon atoms.

9. The mixtures of claim 1 in which the main component comprises quinacridone pigment.

* * * * *